United States Patent
Nainar et al.

(10) Patent No.: US 11,296,982 B2
(45) Date of Patent: Apr. 5, 2022

(54) INITIATOR-BASED DATA-PLANE VALIDATION FOR SEGMENT ROUTED, MULTIPROTOCOL LABEL SWITCHED (MPLS) NETWORKS

(71) Applicant: Cisco Technology, Inc., San Jose, CA (US)

(72) Inventors: Nagendra Kumar Nainar, Morrisville, NC (US); Carlos M. Pignataro, Cary, NC (US); Zafar Ali, Hicksville, NY (US)

(73) Assignee: Cisco Technology, Inc., San Jose, CA (US)

( * ) Notice: Subject to any disclaimer, the term of this patent is extended or adjusted under 35 U.S.C. 154(b) by 60 days.

(21) Appl. No.: 16/852,932

(22) Filed: Apr. 20, 2020

(65) Prior Publication Data
US 2021/0328915 A1 Oct. 21, 2021

(51) Int. Cl.
| | |
|---|---|
| *H04L 12/723* | (2013.01) |
| *H04L 45/50* | (2022.01) |
| *H04L 45/02* | (2022.01) |
| *H04L 43/50* | (2022.01) |
| *H04L 43/10* | (2022.01) |
| *H04L 45/42* | (2022.01) |

(52) U.S. Cl.
CPC ............ *H04L 45/50* (2013.01); *H04L 43/10* (2013.01); *H04L 43/50* (2013.01); *H04L 45/02* (2013.01); *H04L 45/42* (2013.01)

(58) Field of Classification Search
CPC ......... H04L 45/50; H04L 43/10; H04L 43/50; H04L 45/02; H04L 45/42
See application file for complete search history.

(56) References Cited

U.S. PATENT DOCUMENTS

| | | | | |
|---|---|---|---|---|
| 2015/0381444 A1* | 12/2015 | Nainar | ................... | H04L 43/10 |
| | | | | 370/241.1 |
| 2018/0359176 A1* | 12/2018 | Nainar | ................... | H04L 45/34 |
| 2020/0351188 A1* | 11/2020 | Arora | ...................... | H04L 45/08 |
| 2021/0092037 A1* | 3/2021 | Rathi | ...................... | H04L 45/26 |

* cited by examiner

*Primary Examiner* — Donald L Mills
(74) *Attorney, Agent, or Firm* — Lee & Hayes, P.C.

(57) ABSTRACT

Techniques for initiator-based data-plane validation of segment routed, multiprotocol label switched (MPLS) networks are described herein. In examples, an initiating node may determine to validate data-plane connectivity associated with a network path of the MPLS network. The initiating node may store validation data in a local memory of the initiating node. In examples, the initiating node may send a probe message that includes a request for identification data associated with a terminating node. The terminating node may send a probe reply message that includes the identification data, as well as, in some examples, a code that instructs the initiating node to perform validation. In examples, the initiating node may use the validation data stored in memory to compare to the identification data received from the terminating node to validate data-plane connectivity. In some examples, the initiating node may indicate a positive or negative response after performing the validation.

20 Claims, 7 Drawing Sheets

INITIATOR-BASED DATA-PLANE VALIDATION FOR SEGMENT ROUTED, MULTIPROTOCOL LABEL SWITCHED (MPLS) NETWORKS

TECHNICAL FIELD

The present disclosure relates generally to data-plane validation for segment routed, multiprotocol label switched (MPLS) networks.

BACKGROUND

In multiprotocol label switched (MPLS) networks, it is sometimes necessary to validate data-plane connectivity for specific routing paths in the network. To validate data-plane connectivity, MPLS Operations, Administration, and Maintenance (OAM) traditionally works such that an initiating node (e.g., validator node) sends a probe message that includes validation data to a responding node (e.g., a terminating node or far-end node), and the responding node would then use the validation data to perform validation of its respective data-plane connectivity. Once validation is performed by the responding node, the responding node would then send a response back to the initiating node with either a positive response (e.g., that data-plane connectivity is valid) or a negative response (e.g., that data-plane connectivity is in a failed state or otherwise not valid). See, for example, RFC 8029 dated March 2017.

However, using this traditional, MPLS OAM functionality in segment routed networks may sometimes be challenging. For instance, two respective nodes of a segment routed network may comprise multiple interface links between the two nodes and, as such, traditional, MPLS OAM functionality may create false positives when validating data-plane connectivity. As another example, an intermediate node in a segment routed MPLS network may be assigned a binding segment identifier (BSID) to load balance traffic between two or more downstream, terminating nodes. As such, depending on how the intermediate node is load balancing traffic at a given point in time, it may be hard to determine which downstream, terminating node that the validation probe may terminate at.

Accordingly, it is the intention of this disclosure to improve data-plane validation for segment routed, MPLS networks.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

This disclosure describes techniques for initiator-based data-plane validation for segment routed, MPLS networks. In examples, an initiating node of a segment routed, MPLS network may determine to validate data-plane connectivity associated with a network path of the MPLS network that is associated with one or more terminating nodes. The initiating node may then query a path computation element (PCE) of the MPLS network for routing data associated with the network path and/or a terminating node. Once the initiating node receives the routing data from the PCE, the initiating node may store the routing data in a local memory of the initiating node, or may cache the routing data, for a period of time that corresponds with validating data-plane connectivity.

In examples, the initiating node may send a probe message to the terminating node that includes a request for identification and/or routing data associated with the terminating node. The terminating node may then send a reply message back to the initiating node that includes the identification and/or routing data, as well as a code that instructs the initiating node to perform validation. Once the initiating node receives the reply message including the data, the initiating node may then use the routing data stored in memory to compare to the identification and/or routing data received from the terminating node to validate data-plane connectivity. Once the validation is performed, the initiating node may then indicate a positive or negative response.

Additionally, the techniques described herein may be performed as a method and/or by a system having non-transitory computer-readable media storing computer-executable instructions that, when executed by one or more processors, performs the techniques described above.

EXAMPLE EMBODIMENTS

As described above, in multiprotocol label switched (MPLS) networks, it is sometimes necessary to validate data-plane connectivity for specific routing paths in the network. However, using traditional, MPLS Operations, Administration, and Maintenance (OAM) functionality in segment routed networks may sometimes be challenging. Accordingly, this disclosure describes improvements for data-plane validation for segment routed, MPLS networks by using an initiator-based data-plane validation.

In examples, an initiating node of a segment routed, MPLS network may determine to validate data-plane connectivity associated with a network path of the MPLS network that is associated with one or more terminating nodes. For instance, the initiating node may determine to validate the data-plane connectivity according to a predetermined schedule stored locally on the initiating node. Additionally, or alternatively, the initiating node may determine to validate the data-plane connectivity in response to a command issued by a user or technician. For example, a technician may issue a command to the initiating node via a command line interface to begin data-plane validation. Additionally, or alternatively, the initiating node may detect a fault and/or a failure associated with the data-plane and, in response, determine to validate the connectivity of the data-plane to isolate the fault and/or failure.

In examples, the initiating node may store validation data in a local memory or a cache of the initiating node. The validation data may include one or more associations between network paths and respective terminating nodes of the MPLS network. For instance, the validation data may comprise a table, spreadsheet, or other form of data structure that includes associations between respective network paths and respective nodes, or the otherwise relevant OAM information for validating connectivity. The nodes may be segments of a segment routing network, and each node and/or link of the network may comprise its own segment identification (SID).

In examples, the initiating node may store the validation data in its local memory, database, or the cache for a predetermined period of time. For instance, the initiating node may query a path computation element (PCE) of the MPLS network for the validation data associated with the network path and/or the terminating node in response to determining to validate data-plane connectivity. As such, the initiating node may receive the validation data from the PCE and store it in local memory or cache the validation data for a period of time associated with validating data-plane connectivity. In this way, after the period of time has expired, the initiating node may erase the validation data from the local memory and/or clear it from the cache in order to free up storage space and/or resources, thus allowing the node to dedicate more of its resources to networking capabilities. In some examples, the period of time could be equivalent to a lifecycle of sending a ping/probe message for the above described validation, or to a predetermined amount of time in seconds.

In examples, the initiating node may generate and send a probe message to the terminating node that includes a request for identification and/or routing data associated with the terminating node. The probe message may, in some examples, comprise an MPLS OAM Label Switched Path (LSP) Echo Request packet. The probe message may be sent according to a segment routing protocol. Additionally, or alternatively, the probe message may comprise a specific Forwarding Equivalence Class (FEC) Stack Sub-TLV (Type-Length-Value). A semantic associated with this specific FEC Stack Sub-TLV may instruct the terminating node to ignore FEC validation and, instead, reply back to the probe message with its own identification and/or routing data. In some examples, this semantic may instruct the terminating node to add the following in an Echo Reply packet: (a) responding node information; (b) incoming interface information; (c) interface identification; and (d) set the return code to a specific return code that instructs the initiating node that initiator validation is required.

In examples, the terminating node may send a reply message back to the initiating node that includes the identification and/or routing data, as well as the return code that instructs the initiating node to perform validation. The reply message may, in examples, comprise an MPLS OAM LSP Echo Reply packet. The reply message may be sent according to a segment routing protocol. Additionally, the reply message may include one or more of the responding node information, the incoming interface information, the interface identification, and/or the specific return code that instructs the initiating node to perform validation of the data-plane connectivity associated with the routing path.

In examples, the initiating node may receive the reply message including the identification and/or routing data. In response, the initiating node may then compare the identification and/or routing data received from the terminating node with the validation data stored in its local database in order to validate data-plane connectivity. For instance, the initiating node may parse the identification and/or routing data from the reply message and compare it with the validation data stored in its local database. In other examples, the initiating node may parse the validation data and the identification and/or routing data to create checksums, and then compare the checksums to determine whether the data-plane connectivity is valid.

In examples, once the validation is performed by the initiating node, the initiating node may then indicate a positive or negative response. For instance, if the data-plane connectivity is valid, then the initiating node may issue a positive response. In contrast, if the data-plane connectivity is invalid or otherwise in a failed state, the initiating node may issue a negative response. In some examples, the initiating node may indicate the positive or negative response to another node, the PCE, a supervisory control and data acquisition (SCADA) center, issue an output to be seen by an administrator of the network, etc.

Additionally, although the above examples have been described with respect to a segment routed, MPLS network, the techniques described herein are also applicable to SRv6 networks, IP networks, source-routing networks, etc.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

Figure 1:
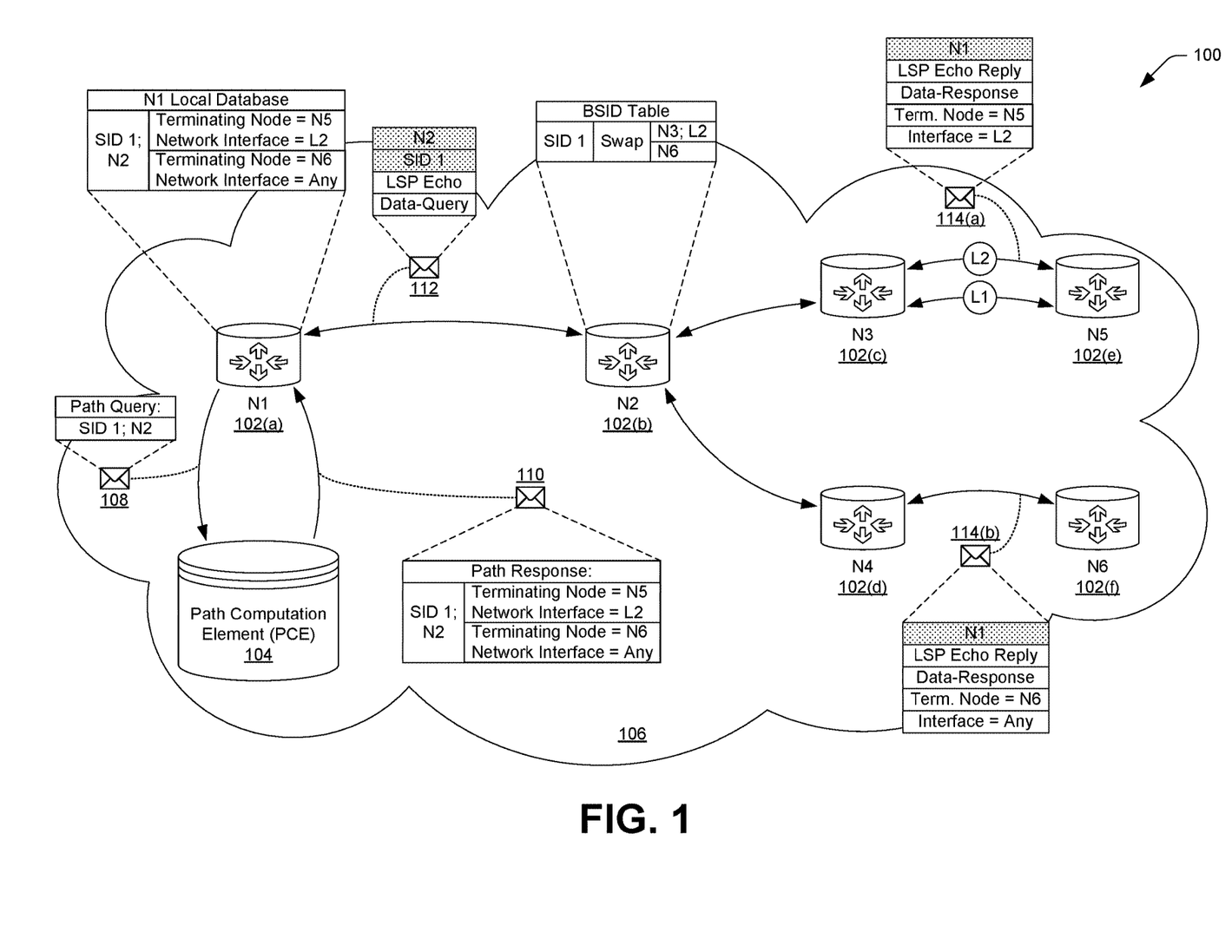
FIG. 1 illustrates a system-architecture diagram of an example MPLS network data-plane that includes a segment routed network of nodes.

FIG. 1 illustrates a system-architecture diagram of an example MPLS network data-plane 100, which includes a segment routed network of nodes 102(*a*)-102(*f*) that may communicate with each other over a network 106. Additionally, the network nodes 102(*a*)-102(*f*) may further be in communication with a path computation element (PCE) 104 via the network 106.

In examples, the network nodes 102(*a*)-102(*f*) and PCE 104 may generally comprise any type of network computing device, such as servers, switches, routers, hubs, bridges, gateways, modems, repeaters, access points, and other type of network device. In some examples, the network nodes 102(*a*)-102(*f*) may comprise a local memory that stores routing path and/or segment identification data associated with a data-plane of the MPLS network. For instance, the network nodes 102(*a*)-102(*f*) may communicate with each other according to a segment routing configuration, and each respective node of the network nodes 102(*a*)-102(*f*) may store segment identification data associated with the MPLS network and/or one or more data-planes of the MPLS network. In other examples, the PCE 104 may store routing path and/or segment identification data associated with the MPLS network or, at least, a data-plane of the MPLS network. In this way, any respective node of the network nodes 102(a)-102(f) may query the PCE 104 for segment identification data and/or routing data. For instance, and as shown in FIG. 1, a network node 102(a) may send a path query 108 to the PCE 104, and the PCE 104 may, in response, send path response data 110 back to the network node 102(a).

In examples, the network 106 may facilitate communications of information or data between a first node and a second node of the network nodes 102(a)-102(f), and/or between the network nodes 102(a)-102(f) and PCE 104. In examples, the network 106 may include one or more networks implemented by any viable communication technology, such as wired and/or wireless modalities and/or technologies. The network(s) 106 may include any combination of Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.) Wide Area Networks (WANs)—both centralized and/or distributed—and/or any combination, permutation, and/or aggregation thereof.

In examples, the network nodes 102(a)-102(f) may send path queries, such as path query 108 sent from network node 102(a), to the PCE 104 in order to determine routing path and/or segment information associated with a segment of the MPLS network. For instance, network node 102(a) (N1) may comprise an initiating node that is trying to validate data-plane connectivity associated with segment identification number (SID) 1 at network node 102(b) (N2) and must query the PCE 104 in order to determine segment information associated with SID 1 and/or N2. In examples, path query 108 may comprise data indicating a request to receive segment routing data associated with a node and/or segment of the network 106. The data of the path query 108 may comprise a segment identification number associated with a segment and/or a node of the network, such as SID 1 and/or N2, a binding segment identification number associated with a segment and/or a node of the network 106, a router identification number, a node identification number, etc.

In examples, the PCE 104 may send segment routing path data, such as path response message 110, to the network nodes 102(a)-102(f) in response to receiving path queries from the network nodes 102(a)-102(f). For instance, and as shown in FIG. 1, PCE 104 may send path response message 110 to network node 102(a) (N1) in response to receiving the path query 108 from the network node 102(a) (N1). In examples, path response message 110 may comprise data indicating one or more associations between SIDs and respective terminating node identifiers and/or network interfaces. For instance, as shown in FIG. 1, path response message 110 may comprise data indicating that SID 1 on N2 (network node 102(b)) is associated with terminating nodes N5 and N6 (network nodes 102(e) and 102(f) respectively), as well as network interface link 2 (L2) for terminating node N5 and any network interface link for terminating node N6.

In examples, the network nodes 102(a)-102(f) may store segment path data of a path response message, such as path response message 110, in a local memory in response to receiving path response messages. For instance, network node 102(a) may cache the segment path data for a period of time associated with validating data-plane connectivity. As such, when network node 102(a) has finished validating data-plane connectivity, network node 102(a) may erase the segment path data from its local memory and/or its cache.

In examples, the network nodes 102(a)-102(f) may send probe messages and replies to probe messages, such as probe message 112 and probe reply messages 114(a) and 114(b), to other nodes and/or segments of the network 106 in order to validate data-plane connectivity. In examples, probe message 112 may comprise an MPLS OAM Label Switch Path (LSP) Echo request packet. Additionally, the probe message 112 may comprise a data-query indicating a request for a terminating node to respond to the probe message 112 with segment routing data associated with the terminating node. In examples, probe reply messages 114(a) and 114(b) may comprise an MPLS OAM LSP Echo reply packet. Additionally, the probe reply messages 114(a) and 114(b) may comprise a data-response including a terminating node and/or segment identifier, and/or an interface link identifier.

In examples, the probe message 112 may further comprise a Forwarding Equivalence Class (FEC) Stack Sub-TLV (Type-Length-Value). In examples, a semantic associated with this FEC Stack Sub-TLV may be for the terminating node to ignore FEC validation and, instead, respond to the probe message 112 by sending a probe reply message 114, which may include node information associated with the terminating node, incoming interface information, an interface identifier, setting the return code of the probe reply message 114 to "Initiator Validation Required," etc. In this way, when the initiating node receives the probe reply message 114 including the return code, the initiating node will perform data-plane validation.

In examples, the network nodes 102(a)-102(f) may comprise one or more binding segment identification (BSID) tables for routing network data. The BSID tables may be stored in a local memory of the network nodes 102(a)-102(f) or may be stored in a memory of the PCE 104. For instance, as shown in FIG. 1, network node 102(b) comprises a BSID table which includes SID 1. The BSID associated with SID 1 is to load balance network traffic between N5 and N6 (network nodes 102(e) and 102(f), respectively). Additionally, SID 1 is further associated with using interface link L2 to route network traffic between N5 and N3 (network node 102(c)).

Figure 2:
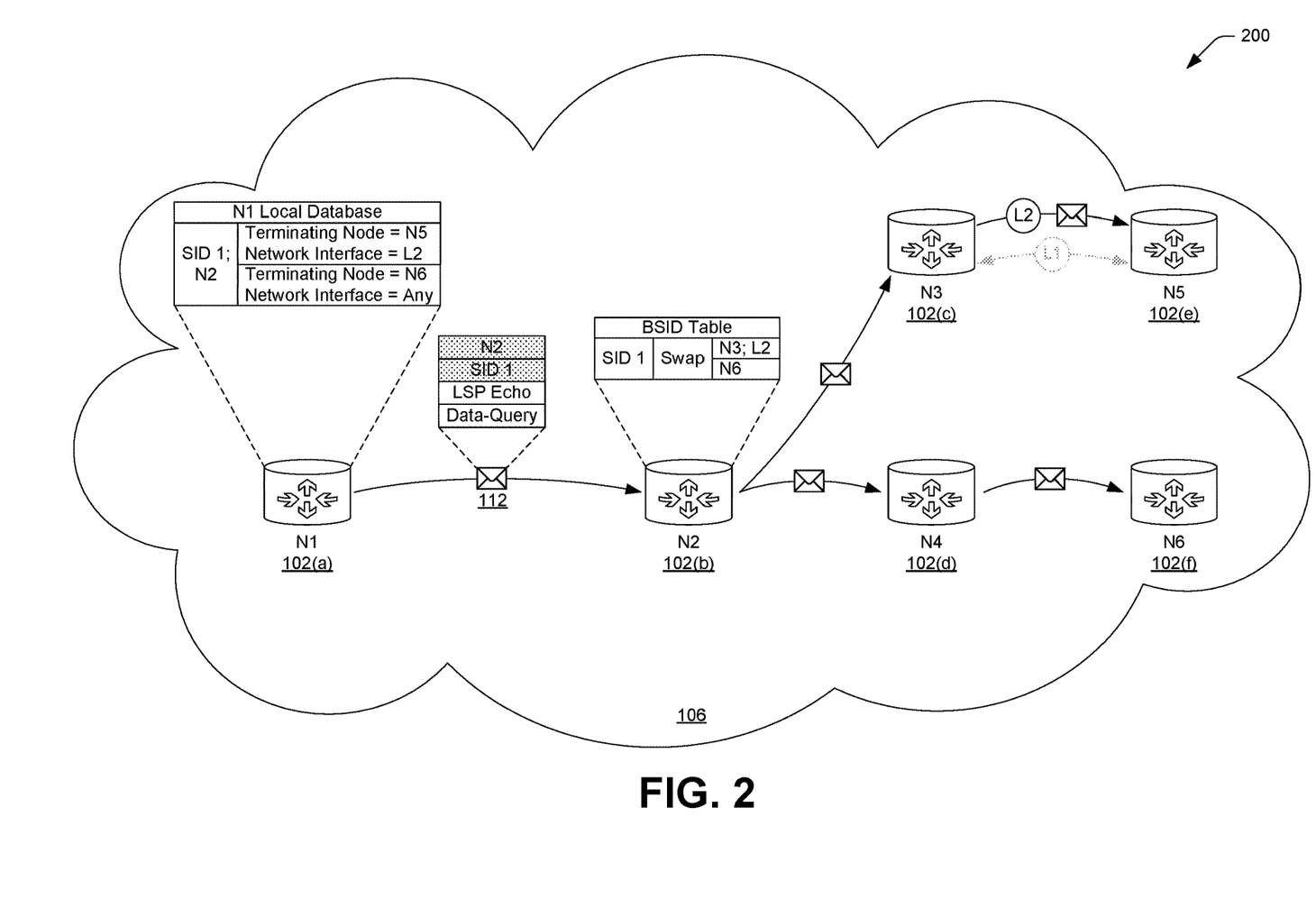
FIG. 2 illustrates a system-architecture diagram of an example MPLS network data-plane that includes a segment routed network of nodes, and in which an initiating node is sending a probe message including a data-query.

FIG. 2 illustrates a system-architecture diagram of an example MPLS network data-plane 200 that includes a segment routed network of nodes 102(a)-102(f), and in which an initiating node N1 (102(a)) of the network of nodes is sending a probe message 112 including a data-query. In the example of FIG. 2, N1 is attempting to validate data-plane connectivity associated with SID 1 on network node N2.

As shown, network node N1's local database is currently populated with verification data. The verification data being stored by N1 may have been received by N1 from a PCE of the network or may have been stored by N1 indefinitely. The verification data in the example of FIG. 2 indicates that SID 1 on network node N2 is a binding SID that load balances network traffic between network nodes N5 and N6. Additionally, the verification data also indicates that when traffic is sent to and/or received from N5, the incoming interface link must be L2, whereas any incoming interface link may be used when traffic is sent to and/or received from N6.

In the example of FIG. 2, Network node N2 (102(b)) comprises a BSID table that, in examples, may be stored in a local memory of N2. N2 has been assigned a BSID to load balance network traffic between network nodes N5 and N6 (102(e) and 102(f), respectively). Additionally, the BSID table indicates that traffic to network node N5 should be communicated via network node N3 and interface link L2. In this way, when N2 receives the probe message 112, it may forward the probe message 112 via the segmented routing path to N5 and/or N6 depending on how N2 is load balancing at any given moment.

Additionally, probe message 112 may comprise an MPLS OAM LSP Echo request packet, as shown. Because N1 is validating data-plane connectivity associated with SID 1 on network node N2, the probe message header comprises SID data corresponding to network node N2 and SID 1. Additionally, the probe message may further comprise an FEC Stack Sub-TLV. In examples, a semantic associated with this FEC Stack Sub-TLV may be for the terminating node, such as terminating nodes N5 and N6, to ignore FEC validation and, instead, send a probe reply message that includes node information associated with the terminating node, incoming interface information, an interface identifier, and/or a return code indicating that initiator validation is required by the initiating node.

Figure 3:
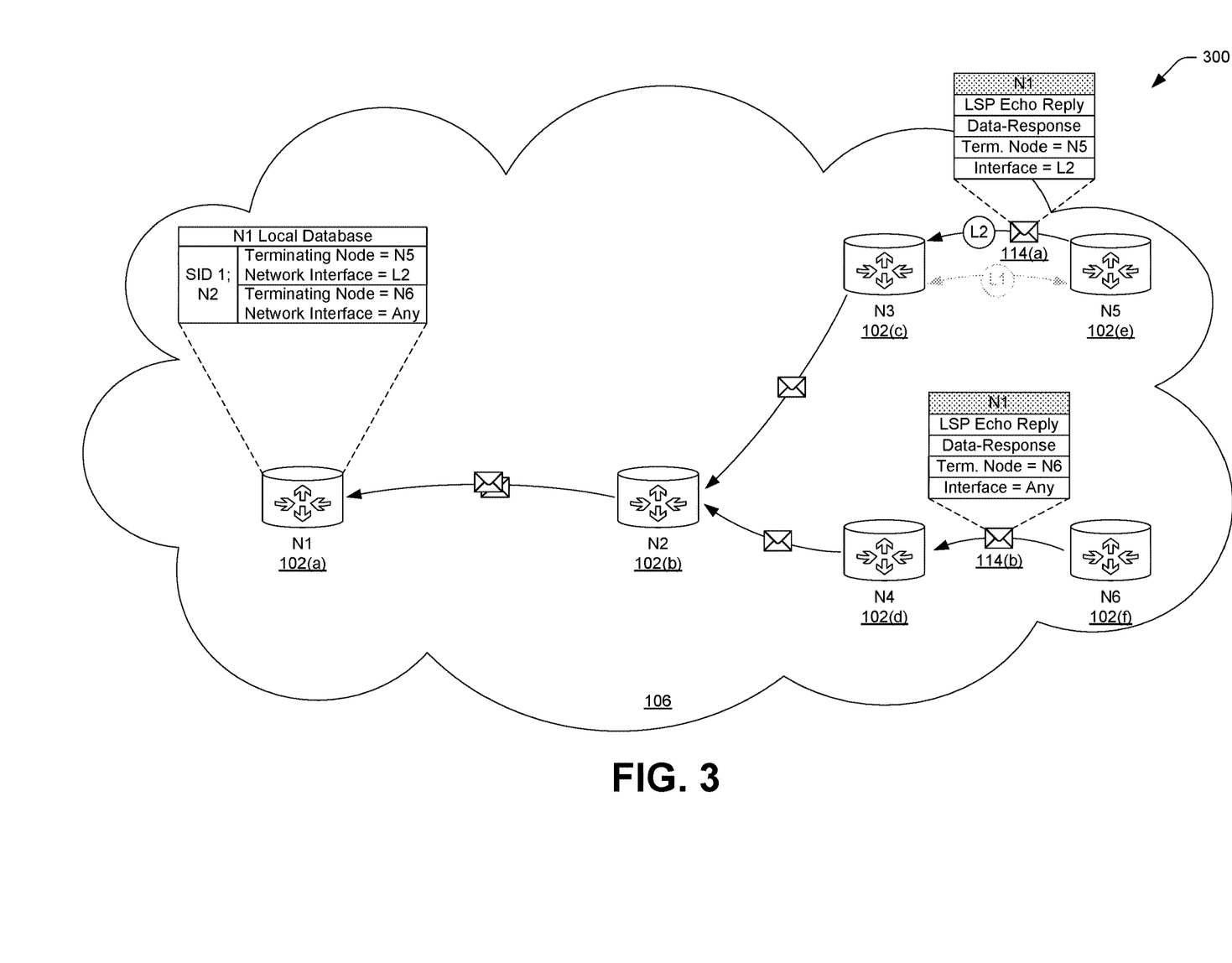
FIG. 3 illustrates a system-architecture diagram of an example MPLS network data-plane that includes a segment routed network of nodes, and in which terminating nodes are sending response messages, which include identification data, to a data-query probe.

FIG. 3 illustrates a system-architecture diagram of an example MPLS network data-plane 200 that includes a segment routed network of nodes 102(a)-102(f), and in which terminating nodes N5 and N6 (102(e) and 102(f), respectively) are sending probe reply messages 114(a) and 114(b) including identification and/or routing data.

In the example of FIG. 3, network nodes N5 and N6 are sending probe reply messages to N1 so that N1 may validate data-plane connectivity. It should be noted that network nodes N5 and N6 may send the probe reply messages 114(a) and 114(b) at different times. For instance, although probe reply messages 114(a) and 114(b) may be sent simultaneously, probe reply messages 114(a) and 114(b) may be sent independent of each other and/or at different times. Additionally, or alternatively, depending on how network node N2 is load balancing at any given time, network nodes N5 or N6 may not both receive the probe message described above with respect to FIG. 2. As such, only one of the network nodes N5 or N6 may, in some examples, send a probe reply message.

As shown in FIG. 3, probe reply messages 114(a) and 114(b) may comprise an MPLS OAM LSP Echo Reply packet. Additionally, probe reply messages 114(a) and 114(b) may be sent according to a segment routing protocol. Probe reply messages 114(a) and 114(b) may include identification and/or routing data associated with the respective network node that generated the probe reply message. For instance, probe reply message 114(a) comprises a routing header indicating that network node N1 is the intended recipient of the message, as well as data indicating that N5 was the terminating node for the probe message, and that interface link L2 was used. On the other hand, probe reply message 114(b) comprises a routing header indicating that network node N1 is the intended recipient of the message, as well as data indicating that N6 was the terminating node for the probe message and that any interface link may have been used for the ingress and/or egress of data to network node N6. Additionally, probe reply messages 114(a) and 114(b) may comprise a return code that instructs the initiating node, N1 in this case, to validate data-plane connectivity.

Network node N2 (102(b)) may receive the probe reply messages 114(a) and 114(b) and, based at least in part on the routing header corresponding to network node N1, forward the probe reply messages 114(a) and 114(b) to N1 so that N1 may validate the data-plane connectivity of the network path. Additionally, network nodes N3 and N4 (102(c) and 102(d), respectively) may forward the probe reply messages 114(a) and 114(b) to network node N2 in a similar fashion according to a segment routing protocol.

Figure 4A:
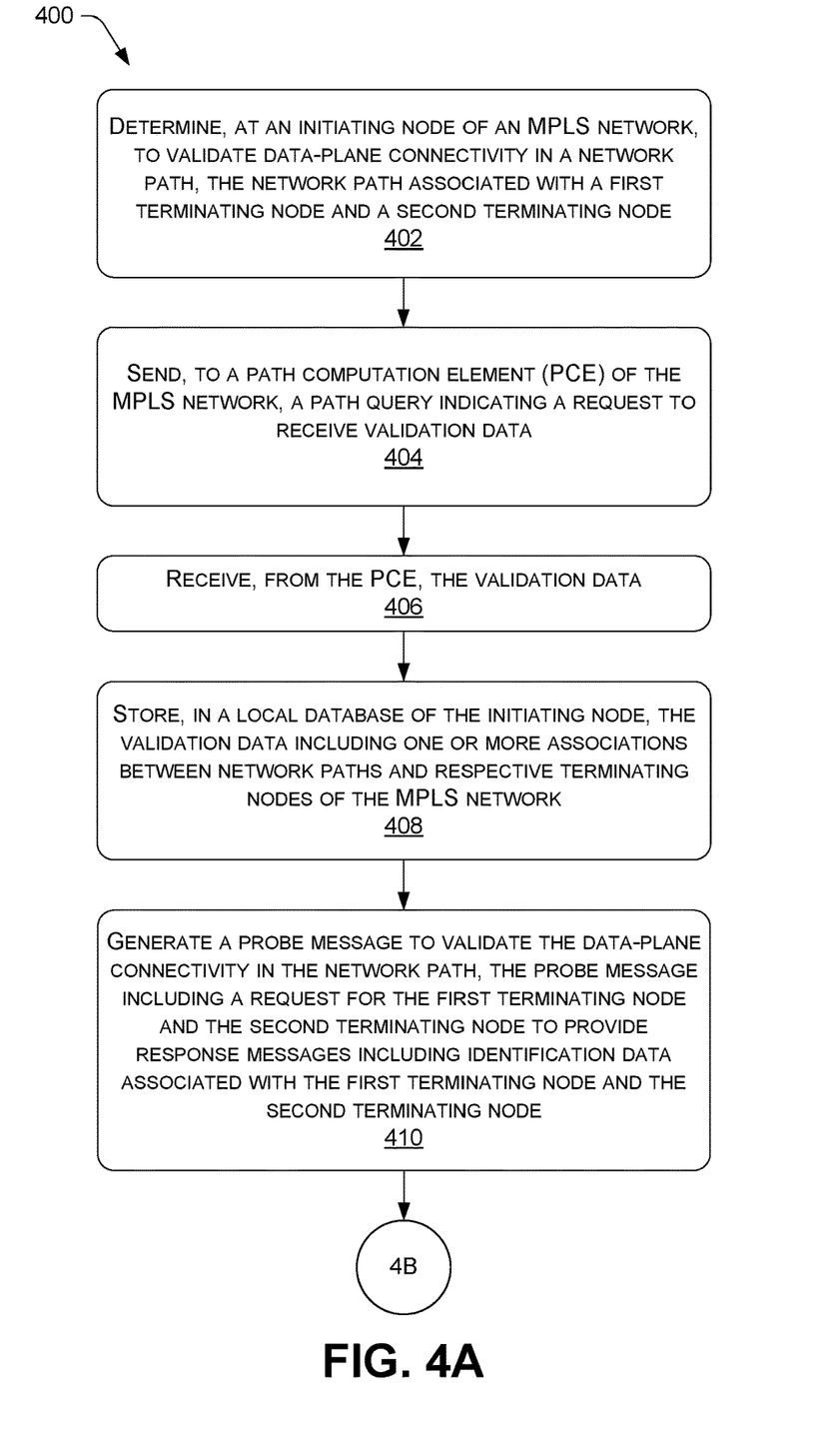
FIGS. 4A and 4B illustrate a flow diagram of an example method for initiator-based data-plane validation of a segment routed, MPLS network.
Figure 4B:
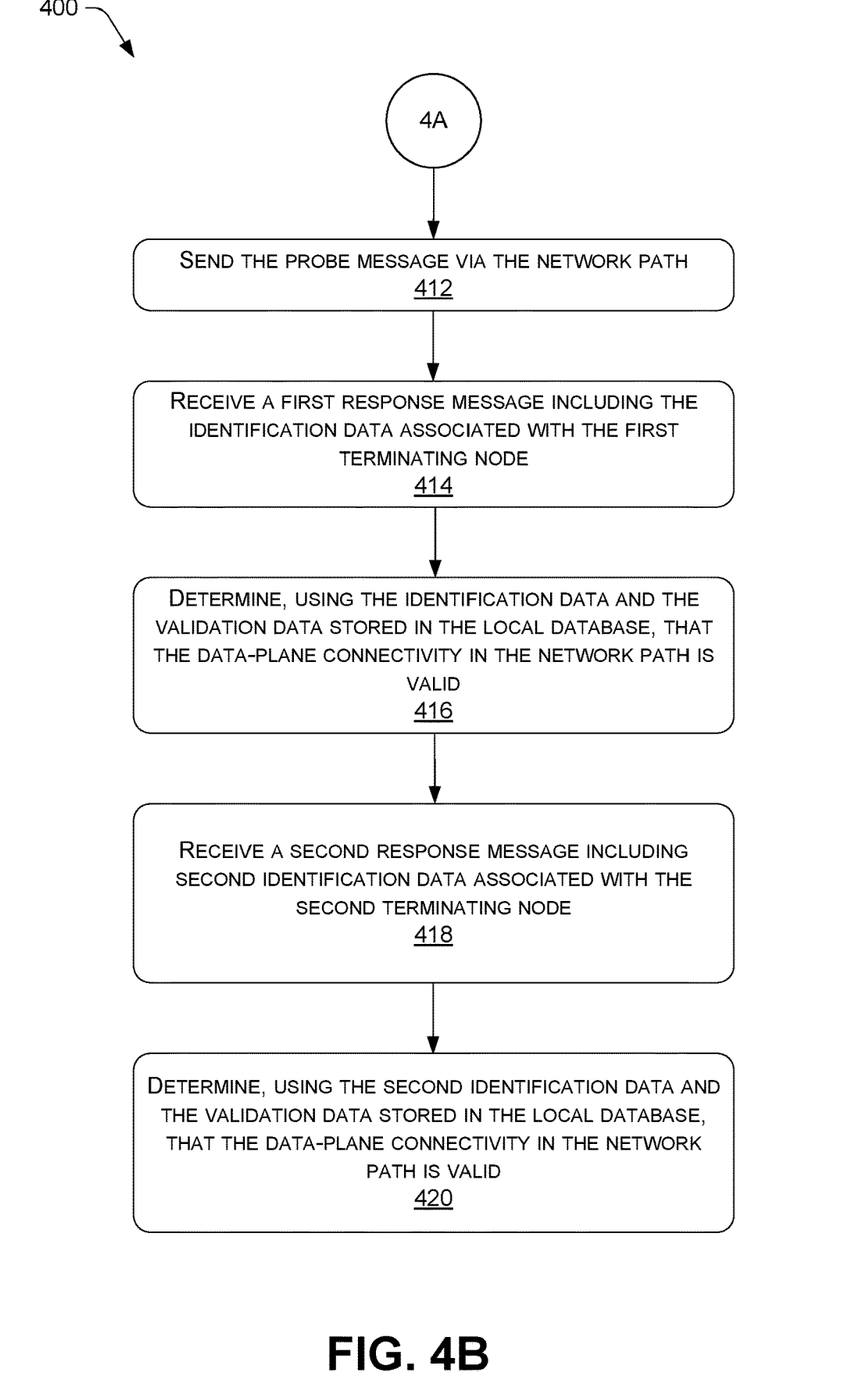
Figure 5:
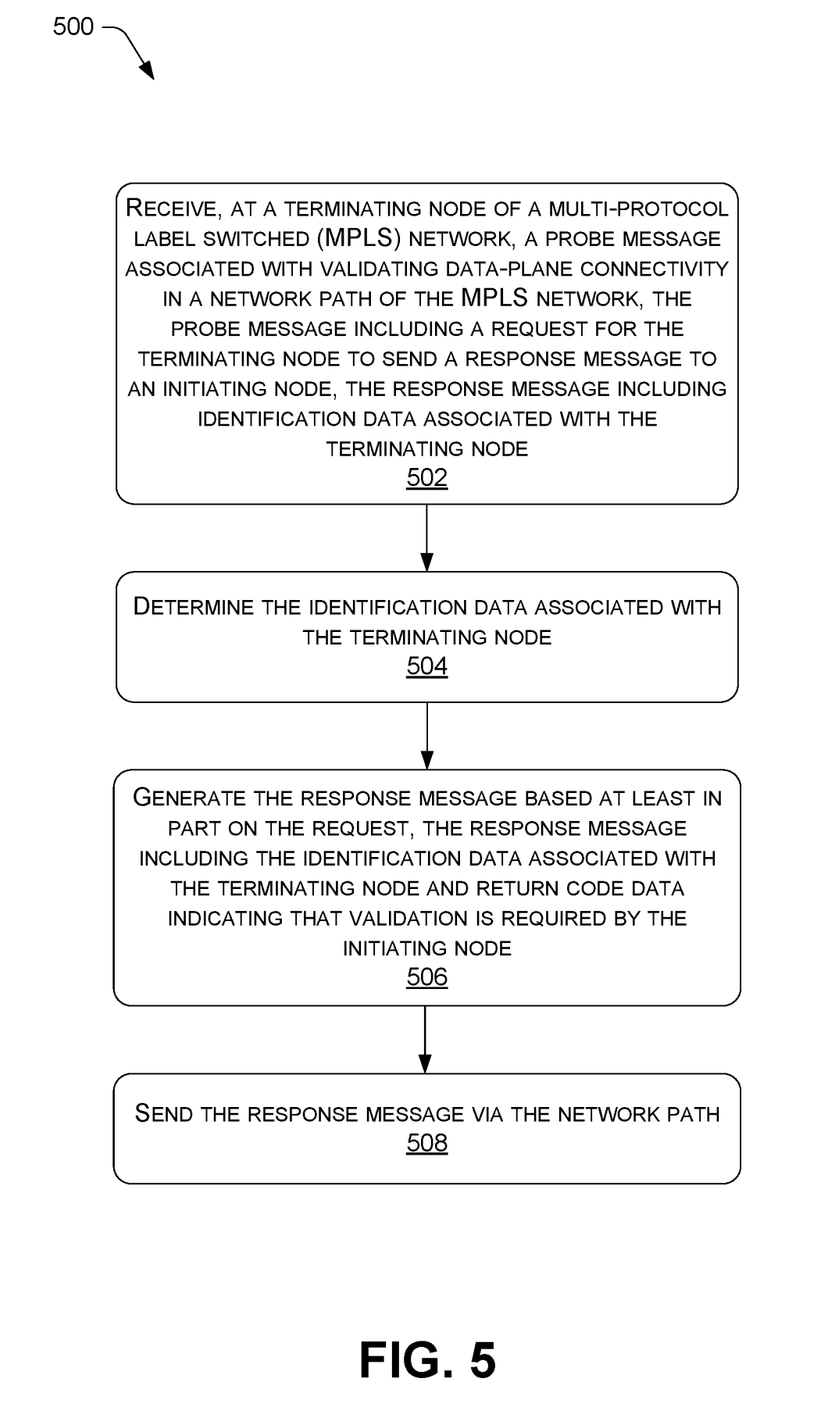
FIG. 5 illustrates a flow diagram of an example terminating node response based on the terminating node receiving a probe message including a data-query.

FIGS. 4A, 4B, and 5 illustrate flow diagrams of example processes according to the various techniques described herein. Although FIGS. 4A, 4B, and 5 illustrate these processes in a step-by-step order, and although these figures will be explained in a step-by-step order as well, any of the steps of these example processes may be performed independently of other steps, in any order, and/or in parallel with other steps. Additionally, steps may be omitted from the example processes and/or replaced with other steps described herein.

FIGS. 4A and 4B illustrate a flow diagram of an example process 400 for initiator-based data-plane validation of a segment routed, MPLS network. At block 402, the process begins by determining, at an initiating node of an MPLS network, to validate data-plane connectivity in a network path, the network path associated with a first terminating node and a second terminating node. In examples, the initiating node may determine to validate the data-plane connectivity according to a pre-determined schedule stored locally on the initiating node. In other examples, the initiating node may determine to validate the data-plane connectivity in response to a command issued by a user or technician. For instance, a technician may issue a command to the initiating node via a command line interface to begin data-plane validation. In further examples, the initiating node may detect a fault and/or a failure associated with the data-plane and, in response, determine to validate the connectivity of the data-plane to isolate the fault and/or failure.

At block 404, the process includes sending, to a path computation element (PCE) of the MPLS network, a path query indicating a request to receive validation data. In examples, the path query may be sent by the initiating node in response to the initiating node determining to validate data-plane connectivity. In other examples, the path query may be sent by another node of the network. The path query may comprise data indicating a specific node and/or segment of the network that the validation data should correspond with.

At block 406, the process includes receiving, from the PCE, the validation data. In examples, the validation data may be received by the initiating node such that the initiating node may perform data-plane validation of the network. The validation data may comprise one or more associations between respective SIDs of the network and respective nodes and/or interface links of the network. In other examples, the validation data may comprise one or more associations between respective BSIDs of the network and respective nodes and/or interface links of the network. Accordingly, the validation data may comprise one or more SIDs, BSIDs, router identification numbers, network interface link identifiers, terminating node identification numbers, interface identification numbers, network path identifiers, etc.

At block 408, the process includes storing, in a local database of the initiating node, the validation data including one or more associations between network paths and respective terminating nodes of the MPLS network. In examples, the initiating node may only store the validation data for a period of time before erasing it from memory. For instance, the initiating node may cache the validation data for a period of time that corresponds with an amount of time associated with validating data-plane connectivity and/or receiving a response to a probe message. In other instances, the initiating node may store the validation data until the initiating node later determines that the data-plane connectivity is valid. In this case, the initiating node may then erase the validation data from memory in response to validating connectivity.

At block 410, the process includes generating a probe message to validate the data-plane connectivity in the network path, the probe message including a request for the first terminating node and the second terminating node to provide response messages including identification data associated with the first terminating node and the second terminating node. In examples, the probe message may comprise an MPLS OAM LSP Echo request packet. Additionally, the probe message may further comprise an FEC Stack Sub-TLV. In examples, a semantic associated with this FEC Stack Sub-TLV may be for a terminating node, which receives the probe message, to ignore FEC validation and, instead, send a probe reply message that includes node information associated with the terminating node, incoming interface information, an interface identifier, and/or a return code indicating that initiator validation is required by the initiating node.

At block 412, the process includes sending the probe message via the network path. In some examples, the network path may include one or more intermediate nodes and/or segments disposed between the initiating node and the first terminating node and/or the second terminating node. In other examples, the network path may comprise a single interface link between the initiating node and the first terminating node and/or the second terminating node. Additionally, sending the probe message may comprise sending the probe message according to a segment routing protocol or an IPv6 protocol.

At block 414, the process includes receiving a first response message including the identification data associated with the first terminating node and, at block 416, the process includes determining, using the identification data and the validation data stored in the local database, that the data-plane connectivity in the network path is valid. In examples, the first response message may comprise a return code indicating that validation of data-plane connectivity is required to be performed by the initiating node. As such, in response to receiving the first response message comprising the return code, the initiating node may determine to validate the data-plane connectivity. In examples, the initiating node may determine whether the data-plane connectivity in the network path is valid by comparing the validation data with the identification data. For instance, the initiating node may determine that the expected first terminating node indicated in the validation data is the same as the first terminating node indicated by the identification data, and so forth. In examples, after determining that the data-plane connectivity is valid, the initiating node may mark the validation as a success. However, if the initiating node determines that the data-plane connectivity in the network path is invalid, the initiating node may mark the validation as a failure and set an error code and/or otherwise trigger the necessary course of action.

At block 418, the process includes receiving a second response message including second identification data associated with the second terminating node and, at block 420, the process includes determining, using the second identification data and the validation data stored in the local database, that the data-plane connectivity in the network path is valid. In examples, the second response message may comprise a return code indicating that validation of data-plane connectivity is required to be performed by the initiating node. As such, in response to receiving the second response message comprising the return code, the initiating node may determine to validate the data-plane connectivity. In examples, the initiating node may determine whether the data-plane connectivity in the network path is valid by comparing the validation data with the identification data. For instance, the initiating node may determine that the expected second terminating node indicated in the validation data is the same as the second terminating node indicated by the identification data, and so forth. In examples, after determining that the data-plane connectivity is valid, the initiating node may mark the validation as a success. However, if the initiating node determines that the data-plane connectivity in the network path is invalid, the initiating node may mark the validation as a failure and set an error code and/or otherwise trigger the necessary course of action.

FIG. 5 illustrates a flow diagram of an example process 500 in which a terminating node generates a probe reply message based on the terminating node receiving a probe message including a data-query. At block 502, the process begins by receiving, at a terminating node of an MPLS network, a probe message associated with validating data-plane connectivity in a network path of the MPLS network, the probe message including a request for the terminating node to send a response message to an initiating node, the response message including identification data associated with the terminating node. In examples, the probe message may comprise an MPLS OAM LSP Echo Request packet. Additionally, or alternatively, the probe message may comprise a specific FEC Stack Sub-TLV, and a semantic associated with this specific FEC Stack Sub-TLV may instruct the terminating node to ignore FEC validation and, instead, send a probe reply message back to the initiating node that includes information associated with the terminating node, information associated with an incoming interface of the terminating node, interface identification data, and/or a return code instructing the initiating node that initiator validation is required.

At block 504, the process includes determining the identification data associated with the terminating node. In examples, the terminating node may store data in a local memory of the terminating node that identifies the terminating node. For instance, the terminating node may store its own SID, incoming network interfaces that the terminating node uses, router identification data associated with the terminating node, and/or other routing data associated with the terminating node. In examples, determining the identification data associated with the terminating node may be based in part on receiving the probe message including the data request. Additionally, determining the identification data may be further based in part on the semantic associated with FEC Stack Sub-TLV of the probe message.

At block 506, the process includes generating the response message based at least in part on the request, the response message including the identification data associated with the terminating node and return code data indicating that validation is required by the initiating node. In examples, and as noted above, the semantic associated with an FEC Stack Sub-TLV of the probe message may instruct the terminating node to generate the response message including the identification data and the return code data. In examples, the identification data associated with the terminating node may comprise data indicating that the probe message terminated at the terminating node. In other examples, the identification data may include an SID of the terminating node, a router identification number of the terminating node, an IP address of the terminating node, an interface identification number, etc.

At block 508, the process includes sending the response message via the network path. In examples, the response message may comprise an MPLS OAM LSP Echo reply packet. Additionally, the network path may comprise one or more intermediate nodes and/or segments disposed between the terminating node and the initiating node that communicate with each other according to a segment routing protocol.

Figure 6:
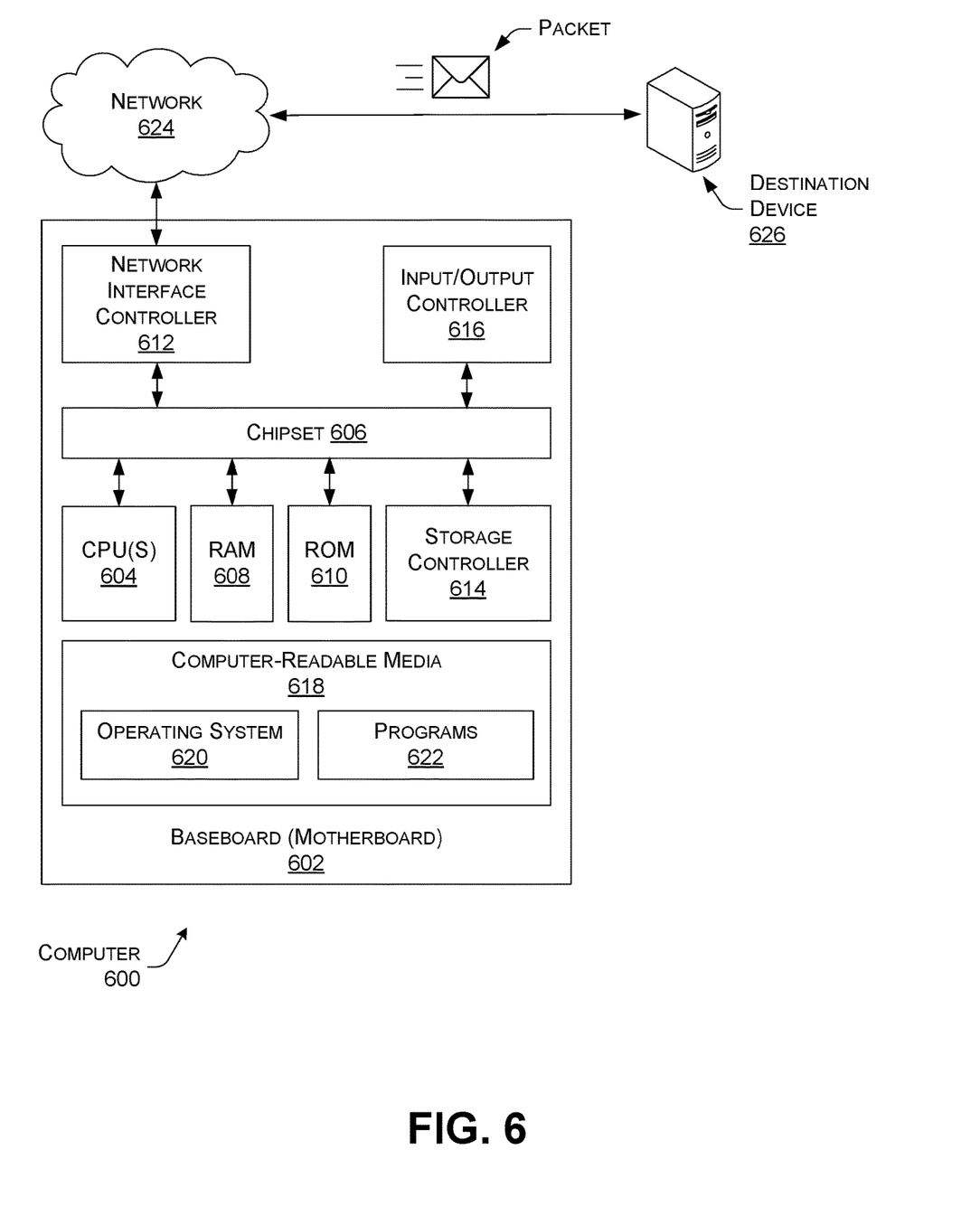
FIG. 6 illustrates a computer architecture diagram showing an illustrative computer hardware architecture for implementing a network device that can be utilized to implement aspects of the various technologies presented herein.

FIG. 6 is a computer architecture diagram showing an illustrative computer hardware architecture for implementing a network device that can be utilized to implement aspects of the various technologies presented herein. The computer architecture shown in FIG. 6 illustrates a conventional server computer, network device, router, switch, gateway, workstation, desktop computer, laptop, tablet, network appliance, e-reader, smartphone, or other computing device, and can be utilized to execute any of the software components presented herein. Additionally, or alternatively, the computer 600 may, in some examples, correspond to a network node, such as network nodes 102(a)-102(f) described herein, and may comprise networked devices such as servers, switches, routers, hubs, bridges, gateways, modems, repeaters, access points, etc. Additionally, or alternatively, the computer 600 may, in some examples, correspond to a path computation element (PCE), such as PCE 104 described herein.

The computer 600 includes a baseboard 602, or "motherboard," which is a printed circuit board to which a multitude of components or devices can be connected by way of a system bus or other electrical communication paths. In one illustrative configuration, one or more central processing units ("CPUs") 604 operate in conjunction with a chipset 606. The CPUs 604 can be standard programmable processors that perform arithmetic and logical operations necessary for the operation of the computer 600.

The CPUs 604 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 606 provides an interface between the CPUs 604 and the remainder of the components and devices on the baseboard 602. The chipset 606 can provide an interface to a RAM 608, used as the main memory in the computer 600. The chipset 606 can further provide an interface to a computer-readable storage medium such as a read-only memory ("ROM") 610 or non-volatile RAM ("NVRAM") for storing basic routines that help to startup the computer 600 and to transfer information between the various components and devices. The ROM 610 or NVRAM can also store other software components necessary for the operation of the computer 600 in accordance with the configurations described herein.

The computer 600 can operate in a networked environment using logical connections to remote computing devices and computer systems through a network, such as the network 106. The chipset 606 can include functionality for providing network connectivity through a NIC 612, such as a gigabit Ethernet adapter. The NIC 612 is capable of connecting the computer 600 to other computing devices over the network 106. It should be appreciated that multiple NICs 612 can be present in the computer 600, connecting the computer to other types of networks and remote computer systems.

In some examples, the NIC 612 may be configured to perform at least some of the techniques described herein, and may include the FPGA 110, IC block 112, and/or other components for performing the techniques described herein.

The computer 600 can be connected to a storage device 618 that provides non-volatile storage for the computer. The storage device 618 can store an operating system 620, programs 622, and data, which have been described in greater detail herein. The storage device 618 can be connected to the computer 600 through a storage controller 614 connected to the chipset 606. The storage device 618 can consist of one or more physical storage units. The storage controller 614 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 600 can store data on the storage device 618 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 618 is characterized as primary or secondary storage, and the like.

For example, the computer 600 can store information to the storage device 618 by issuing instructions through the storage controller 614 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 600 can further read information from the storage device 618 by detecting the physical states or characteristics of one or more particular locations within the physical storage units.

In addition to the mass storage device 618 described above, the computer 600 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 600. In some examples, the operations performed by the network 106 and or any components included therein, may be supported by one or more devices similar to computer 600. Stated otherwise, some or all of the operations performed by the network 106, and or any components included therein, may be performed by one or more computer devices 600 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 618 can store an operating system 620 utilized to control the operation of the computer 600. According to one embodiment, the operating system comprises the LINUX operating system. According to another embodiment, the operating system comprises the WINDOWS® SERVER operating system from MICROSOFT Corporation of Redmond, Wash. According to further embodiments, the operating system can comprise the UNIX operating system or one of its variants. It should be appreciated that other operating systems can also be utilized. The storage device 618 can store other system or application programs and data utilized by the computer 600.

In one embodiment, the storage device 618 or other computer-readable storage media is encoded with computer-executable instructions which, when loaded into the computer 600, transform the computer from a general-purpose computing system into a special-purpose computer capable of implementing the embodiments described herein. These computer-executable instructions transform the computer 600 by specifying how the CPUs 604 transition between states, as described above. According to one embodiment, the computer 600 has access to computer-readable storage media storing computer-executable instructions which, when executed by the computer 600, perform the various processes described above with regard to FIGS. 1-4. The computer 600 can also include computer-readable storage media having instructions stored thereupon for performing any of the other computer-implemented operations described herein.

The computer 600 can also include one or more input/output controllers 616 for receiving and processing input from a number of input devices, such as a keyboard, a mouse, a touchpad, a touch screen, an electronic stylus, or other type of input device. Similarly, an input/output controller 616 can provide output to a display, such as a computer monitor, a flat-panel display, a digital projector, a printer, or other type of output device. It will be appreciated that the computer 600 might not include all of the components shown in FIG. 6, can include other components that are not explicitly shown in FIG. 6, or might utilize an architecture completely different than that shown in FIG. 6.

As described herein, the computer 600 may comprise one or more of a source device 104 or a network device 102. The computer 600 may include one or more hardware processors 604 (processors) configured to execute one or more stored instructions. The processor(s) 604 may comprise one or more cores. Further, the computer 600 may include one or more network interfaces configured to provide communications between the computer 600 and other devices, such as the communications described herein as being performed by the source device 106 and network device 102. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 622 may comprise any type of programs or processes to perform the techniques described in this disclosure for determining connectivity in multi-hop paths using BFD Echo packet(s). The programs 622 may enable the network device 102 to perform various operations. Some of the operations described herein are performed by the IC block 112, the FPGA 110, and/or a combination thereof.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
storing, in a local database of an initiating node, validation data including one or more associations between network paths and respective terminating nodes of a multi-protocol label switched (MPLS) network;
determining, at the initiating node, to validate data-plane connectivity in a network path of the MPLS network, wherein the network path is associated with a first terminating node and a second terminating node;
generating a probe message to validate the data-plane connectivity in the network path;
populating the probe message with a request that the first terminating node populate a response message that includes identification data associated with the first terminating node, wherein the identification data is usable by the initiating node to validate the data-plane connectivity;
sending, from the initiator node, the probe message via the network path;
receiving, at the initiator node, the response message including the identification data associated with the first terminating node; and
determining, at the initiate node and using the identification data and the validation data stored in the local database, that the data-plane connectivity in the network path is valid.

2. The method of claim 1, further comprising:
sending, to a path computation element (PCE) of the MPLS network, a path query indicating a request to receive the validation data;
receiving, from the PCE, the validation data; and
wherein storing the validation data in the local database of the initiating node is based at least in part on the determining to validate the data-plane connectivity in the network path.

3. The method of claim 1, wherein storing the validation data in the local database of the initiating node further comprises storing the validation data for a period of time, the period of time corresponding to an amount of time associated with a lifecycle of the probe message.

4. The method of claim 1, wherein the response message comprises a first response message, the identification data comprises first identification data, and the probe message further includes a request for the second terminating node to provide a second response message including second identification data associated with the second terminating node.

5. The method of claim 4, further comprising:
receiving the second response message including the second identification data associated with the second terminating node; and
determining, using the second identification data and the validation data stored in the local database, that the data-plane connectivity in the network path is valid.

6. The method of claim 1, wherein the response message further comprises an indication that validation of the data-plane connectivity in the network path is required, and wherein determining that the data-plane connectivity in the network path is valid is based at least in part on the indication.

7. The method of claim 1, wherein the identification data associated with the first terminating node comprises:
first data indicating that the probe message terminated at the first terminating node; and
second data indicating an incoming-interface link associated with the first terminating node.

8. An initiating node of a multi-protocol label switched (MPLS) network, the initiating node comprising:
one or more processors; and
one or more non-transitory computer readable media containing instructions that, when executed, configure the initiating node to perform operations comprising:
store validation data including one or more associations between network paths and respective terminating nodes of the MPLS network;
determine to validate data-plane connectivity in a network path of the MPLS network, wherein the network path is associated with one or more terminating nodes;
generate a probe message to validate the data-plane connectivity in the network path;
populate the probe message with a request that the first terminating node populate a response message that includes identification data associated with the first terminating node, wherein the identification data is usable by the initiating node to validate the data-plane connectivity;
send the probe message via the network path;
receive a response message including the identification data associated with the at least one terminating node; and
determine, using the identification data and the validation data, that the data-plane connectivity in the network path is valid.

9. The initiating node of claim 8, wherein the instructions configure the initiating node to perform further operations comprising:
send, to a path computation element (PCE) of the MPLS network, a path query indicating a request to receive the validation data;
receive, from the PCE, the validation data; and
wherein storing the validation data is based at least in part on the determining to validate the data-plane connectivity in the network path of the MPLS network.

10. The initiating node of claim 8, wherein storing the validation data further comprises storing the validation data for a period of time, the period of time corresponding to an amount of time associated with a lifecycle of the probe message.

11. The initiating node of claim 8, wherein the at least one terminating node comprises a first terminating node, the response message comprises a first response message, the identification data comprises first identification data, and the probe message further includes a request for a second terminating node of the one or more terminating nodes to provide a second response message including second identification data associated with the second terminating node.

12. The initiating node of claim 11, wherein the instructions configure the initiating node to perform further operations comprising:
receive the second response message including the second identification data associated with the second terminating node; and
determine, using the second identification data and the validation data, that the data-plane connectivity in the network path is valid.

13. The initiating node of claim 8, wherein the response message further comprises an indication that validation of the data-plane connectivity in the network path is required, and wherein determining that the data-plane connectivity in the network path is valid is based at least in part on the indication.

14. The initiating node of claim 8, wherein the identification data associated with the at least one terminating node comprises:
first data indicating that the probe message terminated at the at least one terminating node; and
second data indicating an incoming-interface link associated with the at least one terminating node.

15. The initiating node of claim 14, wherein the probe message comprises a Forwarding Equivalence Class (FEC) Stack sub Type-Length-Value (sub-TLV) associated with requesting the identification data from the one or more terminating nodes.

16. A method comprising:
receiving, at a terminating node of a multi-protocol label switched (MPLS) network, a probe message associated with validating data-plane connectivity in a network path of the MPLS network, the probe message including a request for the terminating node to send a response message to an initiating node, the response message including identification data associated with the terminating node;
determining the identification data associated with the terminating node;
generating the response message based at least in part on the request, the response message including the identification data associated with the terminating node and return code data indicating that validation is required by the initiating node; and
sending the response message via the network path.

17. The method of claim 16, wherein the identification data comprises first data indicating that the probe message terminated at the terminating node and second data indicating an interface link associated with the terminating node.

18. The method of claim 17, wherein the interface link comprises a first interface link of a plurality of interface links associated with the terminating node and an intermediate node.

19. The method of claim 16, wherein:
the response message comprises an MPLS label switched path (LSP) echo reply packet; and
the identification data comprises an incoming-interface link on which the probe packet was received at the first terminating node.

20. The method of claim 16, wherein generating the response message is further based at least in part on a Forwarding Equivalence Class (FEC) stack sub Type-Length-Value (sub-TLV) of the probe message that is associated with a request for the terminating node to provide the identification data.

* * * * *